United States Patent
Harada et al.

(10) Patent No.: US 7,967,032 B2
(45) Date of Patent: Jun. 28, 2011

(54) ENTRANCE/EXIT PIPING STRUCTURE FOR INTERCOOLER AND INTERCOOLER

(75) Inventors: Masaki Harada, Kariya (JP); Sumio Susa, Anjo (JP); Haruhiko Watanabe, Chiryu (JP)

(73) Assignee: Denso Corporation, Kariya (JP)

( * ) Notice: Subject to any disclaimer, the term of this patent is extended or adjusted under 35 U.S.C. 154(b) by 1220 days.

(21) Appl. No.: 11/604,505

(22) Filed: Nov. 27, 2006

(65) Prior Publication Data

US 2007/0119431 A1    May 31, 2007

(30) Foreign Application Priority Data

Nov. 30, 2005    (JP) .................................. 2005-346196
Aug. 22, 2006    (JP) .................................. 2006-225557

(51) Int. Cl.
*F16L 11/00*    (2006.01)
*F01N 7/10*    (2006.01)

(52) U.S. Cl. ............ 138/116; 138/117; 138/177; 60/323
(58) Field of Classification Search .......... 138/115–117, 138/177, 178; 60/323, 322
See application file for complete search history.

(56) References Cited

U.S. PATENT DOCUMENTS

| | | | | |
|---|---|---|---|---|
| 3,476,869 A | * | 11/1969 | Hawkins | ....................... 174/68.3 |
| 4,513,601 A | * | 4/1985 | Herbulot | ......................... 72/398 |
| 5,227,585 A | * | 7/1993 | Zen | ................................. 174/95 |
| 5,761,905 A | * | 6/1998 | Yamada et al. | .................. 60/322 |
| 6,311,676 B1 | | 11/2001 | Oberg et al. | ................... 123/563 |
| 6,390,142 B1 | * | 5/2002 | Naito | .............................. 138/177 |
| 6,467,261 B1 | * | 10/2002 | Hisanaga et al. | ............... 60/323 |
| 6,725,655 B2 | * | 4/2004 | Yoshirawa et al. | ............. 60/323 |
| 6,929,035 B2 | * | 8/2005 | Debaisieux et al. | ........... 138/115 |
| 6,959,543 B2 | * | 11/2005 | Havemann et al. | .............. 60/323 |
| 7,731,241 B2 | * | 6/2010 | Aoki et al. | .................. 285/129.1 |
| 2003/0056505 A1 | * | 3/2003 | Havemann et al. | ............... 60/323 |
| 2005/0194119 A1 | | 9/2005 | Yamanaka et al. | ............... 165/67 |
| 2007/0114013 A1 | | 5/2007 | Augenstein et al. | .......... 165/ 174 |

FOREIGN PATENT DOCUMENTS

| | | |
|---|---|---|
| CN | 2112699 U | 8/1992 |
| CN | 2586035 | 11/2003 |
| DE | 10 2005 040 357 | 4/2006 |
| JP | 61-19635 | 2/1986 |
| JP | 11-101591 | 4/1999 |
| JP | 2004-069128 | 3/2004 |
| WO | WO 2005/031239 | 4/2005 |

OTHER PUBLICATIONS

Office action dated Mar. 25, 2010 in German Application No. 10 2006 055 920.7-13.
Office action dated Feb. 15, 2008 in Chinese Application No. 2006 10163708.4 with English translation thereof.
Notice of Reasons for Rejection dated Jul. 12, 2010 in corresponding JP Application No. 2006-225557 with English translation.

\* cited by examiner

*Primary Examiner* — Patrick F Brinson
(74) *Attorney, Agent, or Firm* — Harness, Dickey & Pierce, PLC

(57) ABSTRACT

The inventive entrance/exit piping structure 20 for an intercooler 10 is formed of a plurality of pipes 21 to 24, the pipe end portions 20a, 20b are bundled together to have a circular contour and, in a middle portion 20c, the respective pipes are arranged adjacent to each other and are bent together.

10 Claims, 8 Drawing Sheets

CROSS-SECTION OF FLAT PORTION IN CONVENTIONAL ENTRANCE/EXIT PIPING STRUCTURE (COMPARISON OF THE PRESENT INVENTION WITH THE PRIOR ART)

THE PRESENT INVENTION

THE PRIOR ART

THE CROSS-SECTIONAL AREA IS IDENTICAL

CROSS-SECTION OF PIPE END PORTION

CROSS-SECTION OF MIDDLE PORTION

_US 7,967,032 B2_

ENTRANCE/EXIT PIPING STRUCTURE FOR INTERCOOLER AND INTERCOOLER

BACKGROUND OF THE INVENTION

1. Field of the Invention

The present invention relates to an entrance/exit piping structure for an intercooler, in an intake system of an internal combustion engine, for cooling pressurized air fed from a supercharger to the intercooler and then to an engine body.

2. Description of the Related Art

Generally, to increase an engine output, a large amount of air is fed to the engine through a supercharger. However, as air is compressed in the supercharger, the temperature of the air rises to, for example, approximately 180° C. To supply the pressurized air to the engine body after cooling the air to increase the density thereof, an intercooler is used.

In such a case, the intercooler is disposed on the front of a radiator. That is, there are arranged the intercooler, the radiator, a cooling fan and the engine body in this order from a front side of a vehicle. On the other hand, as the supercharger is driven by the engine or by exhaust gas from the engine, it is disposed in the vicinity of the engine body. Accordingly, a piping structure for connecting the intercooler with the supercharger and with the engine body is shaped to cross the radiator.

Also, the radiator is generally mounted on the vehicle so that upper and lower tanks (header tanks) are disposed in the upward/downward direction, while the intercooler is selected to be either a vertical type wherein a pipe section is disposed in the upward/downward direction or a horizontal type wherein a pipe section is disposed in the leftward/rightward direction in accordance with the space in the engine compartment. The present invention relates to an improvement in the entrance/exit piping structure of the intercooler when the horizontal type intercooler is adopted. There is usually little room in the engine compartment in the horizontal direction.

In the prior art, an entrance/exit pipe 2 of an intercooler 1 is formed to have a portion bending approximately 90° as shown in FIG. 8 to allow it to pass through a slight gap between the upper part of the radiator 3 and the body frame or a bonnet. In this case, as it is difficult to bend a thick and round pipe to have such a severe curvature as well as to pass the same through the small gap, the bending portion 2a of the entrance/exit pipe 2 is formed to be of a flat shape as shown in FIG. 9 in an enlarged manner. Thereby, the entrance/exit pipe 2 is easily bendable and is capable of avoiding interference with the radiator 1, or other parts, when the intercooler 1 is mounted on the vehicle.

However, in view of environmental problems, the emission regulation of emission gas from diesel engine has recently been strict more and more. For instance, as shown in FIG. 10, in Europe, the limit on NOx in the exhaust gas from a large-sized truck, which was 5 (g/kwh) in EURO 3, is now 3.5 (g/kwh) in EURO 4 and will be 2 (g/kwh) in EURO 5 which is expected to start from 2008. Also, a PM (particulate matter) value which was 0.1 (g/kwh) in EURO 3 will be 0.02 (g/kwh) in EURO 5.

To satisfy these limits, it will be necessary to increase the pressure of pressurized air output from the supercharger, which is 1.8 (kgf/cm$^2$) at present, to 2.7 (kgf/cm$^2$) and finally to 3.6 (kgf/cm$^2$) and also to increase the temperature of the pressurized air, which is 180 (° C.) at present, to 204 (° C.) and finally to 239 (° C.).

Accompanied with such increase in supercharged air pressure and temperature, a problem will occur in the conventional entrance/exit piping structure wherein the bending portion of the intercooler is flattened (particularly, in the entrance piping structure); that is, the strength becomes insufficient and this portion is liable to deform or broken. To increase the strength, it will be necessary to provide ribs in a pipe wall or pillars in the interior of the pipe, which would result in an increase in cost or in difficulty in the molding process.

SUMMARY OF THE INVENTION

The present invention has been made to provide an entrance/exit piping structure, for an intercooler, capable of avoiding interference with the radiator or other parts and having the sufficient strength against high pressure and temperature supercharged air, while being easily moldable.

In the inventive entrance/exit piping structure for an intercooler according to one aspect, the entrance/exit piping structure is formed of a plurality of pipes 21 to 27, one of both pipe end portions 20a, 20b to be coupled to a supercharger-side piping or an engine body-side piping are bundled together to have a contour approximately the same as a contour of the piping, and a generally middle portion of the entrance/exit piping structure is bent. Thereby, it is possible to easily bend the pipe and to increase the strength of the pipe without forming the flattened portion of the pipe as in the conventional entrance/exit piping structure.

According to the inventive entrance/exit piping structure, the pipe end portions 20b to be coupled to a piping for a header tank 14A, 14B of the intercooler has a contour approximately the same as a contour of a coupling portion of the header tank. Thereby, it is possible to couple the pipe end portion to the coupling portion of the header tank.

According to the inventive entrance/exit piping structure, in a part of the entrance/exit piping structure, the plurality of pipes 21 to 27 forming the entrance/exit piping structure are arranged adjacent to each other to satisfy the requirements of space and strength.

According to the inventive entrance/exit piping structure, it has approximately the same cross-sectional area in all the cross-sections thereof. Thereby, it is possible to prevent the loss of fluid pressure.

According to the inventive entrance/exit piping structure, the cross-sectional shape of the end portion of the respective pipe 21 to 27 forming the entrance/exit piping structure 20 is generally a sector, while the cross-sectional shape of the middle portion of the respective pipe is generally a circle whereby, as it is possible to reduce the diameter of the pipe, the bending thereof becomes easier.

According to the inventive entrance/exit piping structure, the pipes 21 to 27 in the entrance/exit piping structure are bent approximately at an angle of 90° whereby it is possible to arrange that the entrance/exit piping structure provided a gap in the engine compartment above the radiator is equal to approximately an outer diameter of the pipe.

The inventive intercooler comprises two tanks disposed opposite to each other, an entrance piping provided in the tank and connected to a supercharger-side pipe for passing pressurized air supplied from a supercharger, a heat exchanging core connected to the tank, for cooling the pressurized air supplied from the entrance piping to increase the air density, and an exit piping connected to an engine-side pipe for supplying the pressurized air to an engine body, wherein at least either one of the entrance piping or the exit piping is constituted by a plurality of pipes 21 to 27 so that each of opposite pipe end portions 20a, 20b thereof are bundled together to be connectable to at least either one of the supercharger-side pipe or the engine-side pipe while, in a middle portion thereof, the pipes are arranged adjacent to each other and bent together.

The present invention may be more fully understood from the description of preferred embodiments of the invention, as set forth below, together with the accompanying drawings.

DESCRIPTION OF THE PREFERRED EMBODIMENTS

Figure 1:
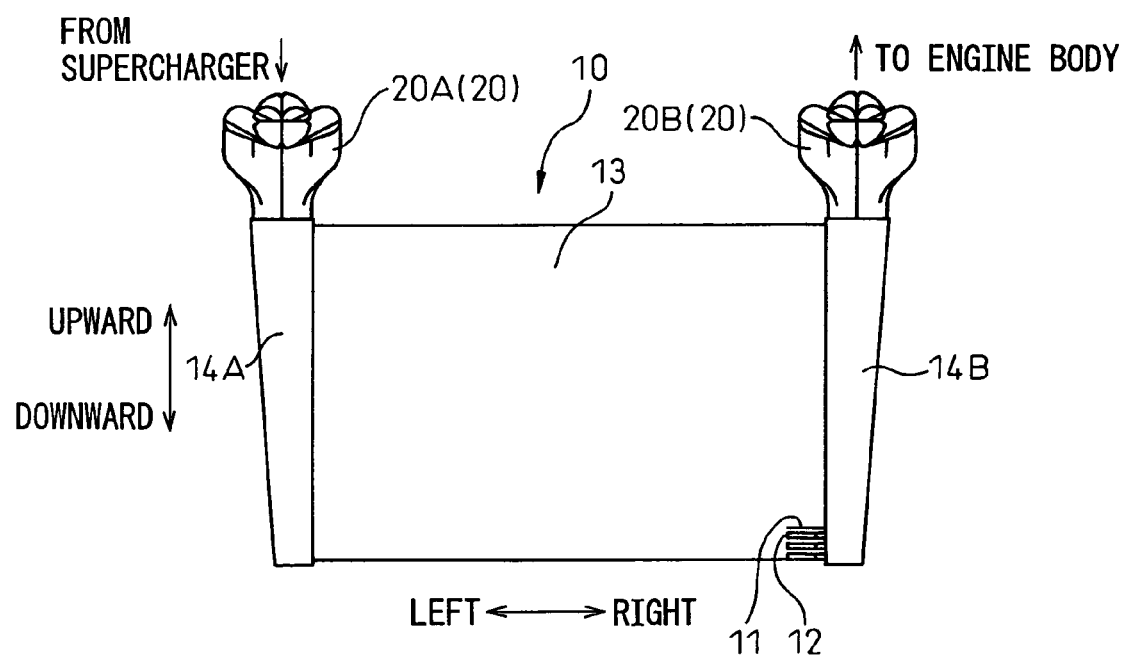
FIG. 1 is a front view of an intercooler provided with an entrance/exit piping structure according to a first embodiment of the present invention.
Figure 2A:
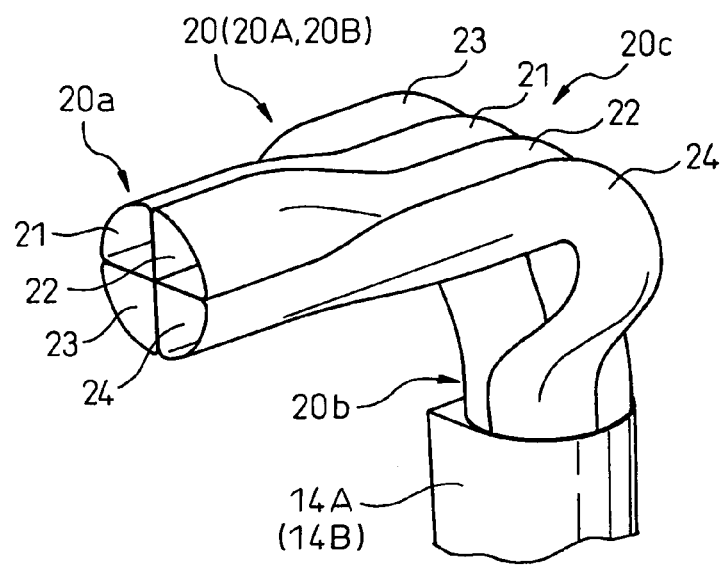
FIG. 2A is a perspective view of the entrance/exit piping structure according to the first embodiment.
Figure 2B:
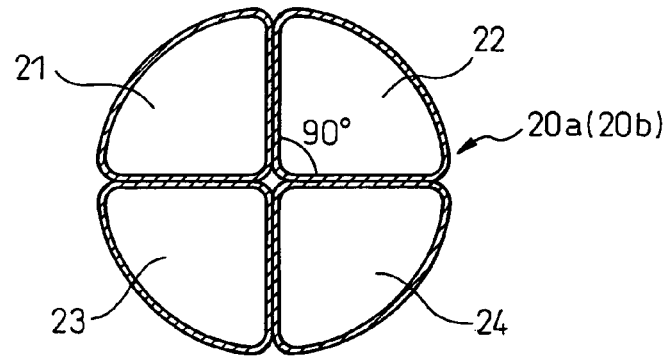
FIG. 2B is a cross-section of an end portion of a pipe in this piping structure.

The inventive entrance/exit piping structure for an intercooler according to the preferred embodiments will be described below with reference to the drawings. FIG. 1 illustrates an overall structure of an intercooler having an entrance/exit piping structure according to one embodiment; FIG. 2A is a cross-section of an end portion of a pipe in the entrance/exit piping structure; and FIG. 2B is a cross-section of a middle portion (a bending portion) of the entrance/exit piping structure. In this description, while the entrance/exit piping structure is explained as being used for an intercooler for cooling pressurized air fed from the supercharger and supplying the same to an internal combustion engine, it may be properly applicable to heat exchangers other than the intercooler.

Figure 8:
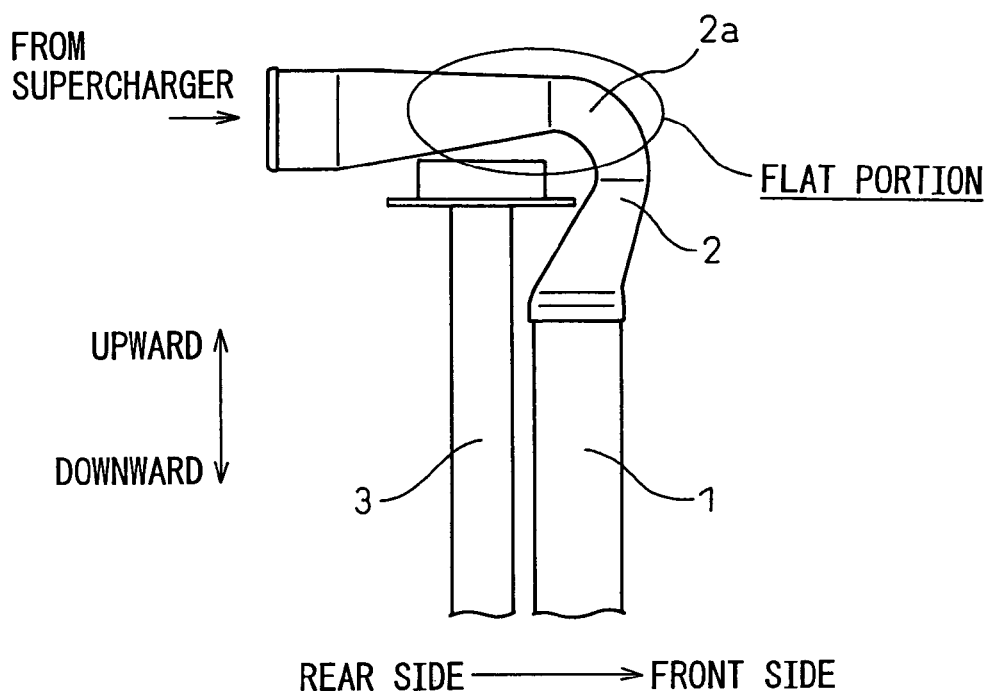
FIG. 8 is an illustration for explaining an entrance/exit piping structure for the conventional intercooler.
Figure 9:
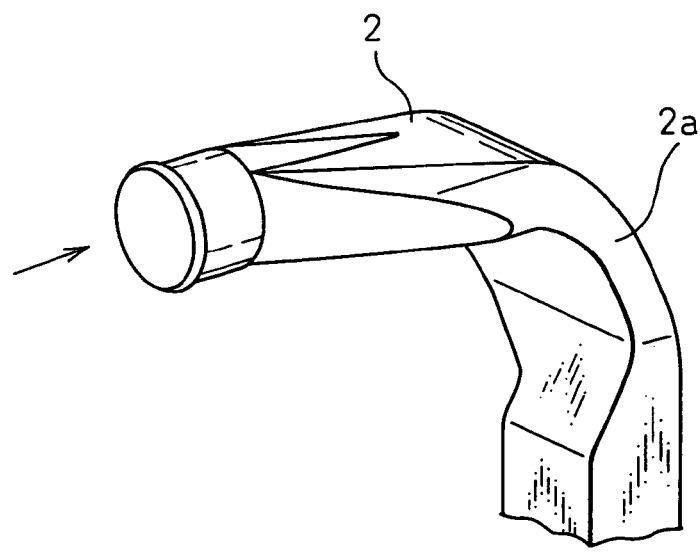
FIG. 9 is a perspective view of the conventional entrance/exit piping structure.
Figure 10:
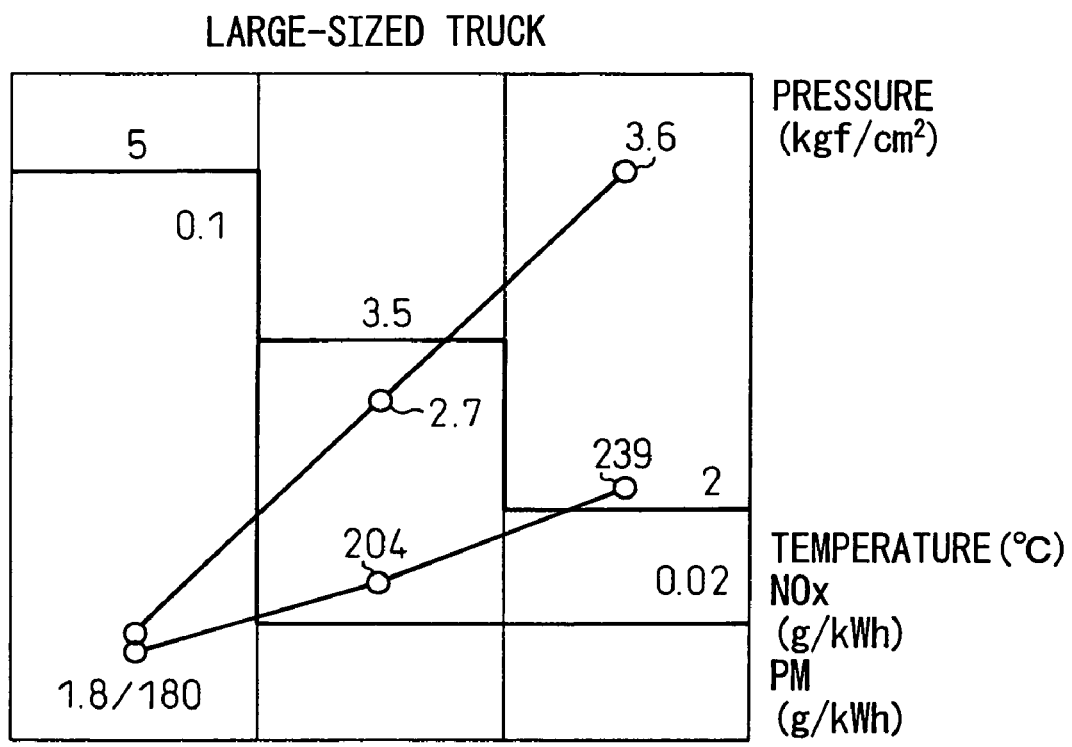
FIG. 10 is a graph for explaining the tendency of the regulation value of emission gas in EURO (Europe) and the variation of pressure and temperature of the pressurized air after the supercharger.

As shown in FIG. 1, the intercooler 10 includes a heat changing core 13 formed of a plurality of flat tubes 11 and a plurality of wave-shaped fins (corrugated fins), alternately stacked and header tanks 14A, 14B provided on both sides of the heat exchanging core 13. As shown in FIG. 8, the intercooler 10 is disposed on the front side of a radiator and fixed to a frame (not shown) for protecting the radiator. Both header tanks 14A and 14B coupled to opposite sides of the flat tube 11 are arranged in the widthwise direction (leftward/rightward direction) of the vehicle. An entrance pipe 20A is coupled to the upper end surface of the entrance side header tank 14A, and an exit pipe 20B is coupled to the upper end surface of the exit side header tank 14B. The entrance pipe 20A and the exit pipe 20B are generally of the same shape for production reasons. In this regard, the entrance/exit piping structure is totally referred to both of the entrance pipe 20A and the exit pipe 20B in this embodiment. As air pressurized in a supercharger increases in air density by being cooled in the intercooler 10, conditions of pressure and temperature are severe in the entrance pipe 20A and are mitigated in the exit pipe 20B. Accordingly, it is not necessary to equalize the structure of the former to that of the latter. However, it is necessary to adopt the entrance/exit piping structure of this embodiment at least in the entrance pipe 20A.

The intercooler 10 is of a type wherein pressurized air passes only once between both the header tanks 14A, 14B (a one-passage type) wherein each of the header tanks 14A, 14B has a cross-sectional area reducing from the upper portion to the lower portion so that the pressurized air uniformly flows through the respective tubes 11.

In the intercooler 10 structured as described above, air pressurized by the supercharger (supplied air) enters the header tank 14A through the entrance pipe 20A and enters the header tank 14B through the tubes 11 of the heat exchanging core 13, which then fed to the engine body through the exit pipe 20B. Contrarily, outer air sucked in by a cooling fan (not shown) flows outside of the tube 11 from the front side to the rear side of a paper while crossing the pressurized air passing through the tube 11, whereby the heat exchanging is carried out between the pressurized air and the outer air. Thus, the pressurized air of approximately 180° C. on the entrance side thereof is cooled to approximately 50° C. on the exit side. Accordingly, the pressurized air is cooled to increase in its density whereby the charging efficiency of engine improves to increase the output power.

Next, an entrance/exit piping structure 20 which is a feature of the present invention will be described. As described above, the intercooler 10 is disposed on the front side of the radiator, while the supercharger and the engine body are disposed on the rear side of the radiator. Accordingly, it is necessary to form the entrance/exit piping structure 20 of the intercooler 10 so that it rides across the upper header of the radiator (in this regard, both the headers of the radiator are arranged on upper and lower sides, respectively) and passes through a narrow gap of the engine compartment above the radiator.

According to this embodiment, the entrance/exit piping structure 20 (the entrance pipe 20A and the exit pipe 20B) is constituted by a plurality of pipes 21, 22, 23 and 24, and both end portions 20a, 20b (the one end portion 20a is coupled to the supercharger or the engine body and the other end portion 20b is coupled to the header tank 14A or 14B) are bundled, respectively, to be a one-piece body having a circular contour without any gaps between pipes 21 to 24. In FIGS. 1 and 2A to 2C, the cross-section of the end portion of each the four pipes 21 to 24 is deformed to be a sector having an angle of 90° as shown in FIG. 2B, and the four sectors are combined together to be a circular contour. Accordingly, in this case, a cross-shaped boundary is formed in each of the pipe end portions 20a, 20b. The circular contour of the pipe end portion 20a, 20b facilitates the coupling thereof with the header tank 14A, 14B and with the supercharger or the engine body.

Figure 2C:
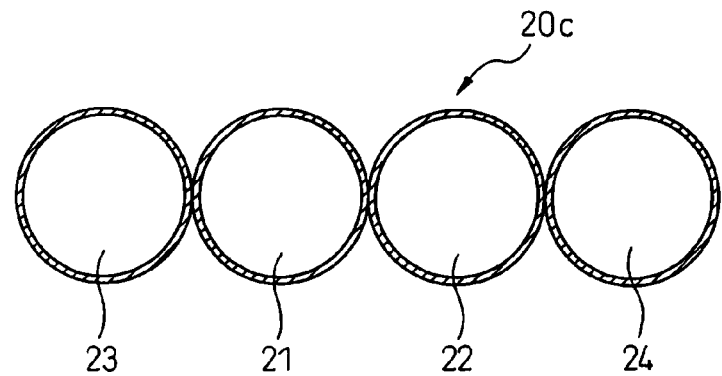
FIG. 2C is a cross-section of a middle portion (bending portion) of the piping structure.

Further, as shown in FIG. 2C, in the flat middle portion (the bending portion) of the entrance/exit piping structure 20, the respective pipes 21 to 24 are laterally arranged adjacent to each other and are bent approximately at 90°. That is, the respective pipes 21 to 24 are laterally arranged while keeping the circular cross-section. Accordingly, if there is a gap corresponding to the outer diameter of the respective pipe 21 to 24, it is possible to arrange the entrance/exit piping structure.

Figure 3:
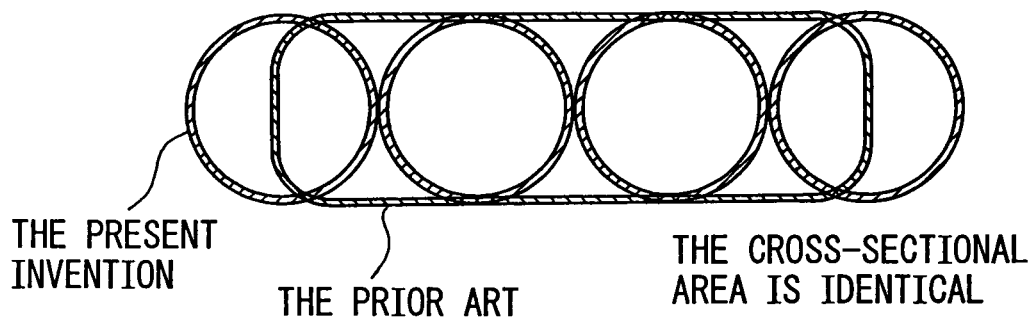
FIG. 3 shows the comparison of a flat portion in the conventional entrance/exit piping structure with a cross-section of a flat middle portion in the entrance/exit piping structure according to the embodiment of the present invention, while equalizing the cross-sectional areas of the both.

This entrance/exit piping structure 20 has approximately the same cross-sectional area in all cross-sections cut in the direction orthogonal to the pipe axis to avoid a loss of fluid pressure. FIG. 3 shows the comparison of a flat portion in the conventional entrance/exit piping structure with a cross-section of a flat middle portion in the entrance/exit piping structure according to the embodiment of the present invention, wherein the cross-sectional areas of both are identical. The comparison is carried out while a height of the conventional flat portion is equal to the outer diameter of the inventive pipe. As is apparent from the drawing, in spite of equalizing the cross-sectional area of a flow path, it is possible in this embodiment to reduce the pressure-receiving area for pressurized air flowing through the pipe, whereby the deformation of the pipe is minimized.

Figure 4:
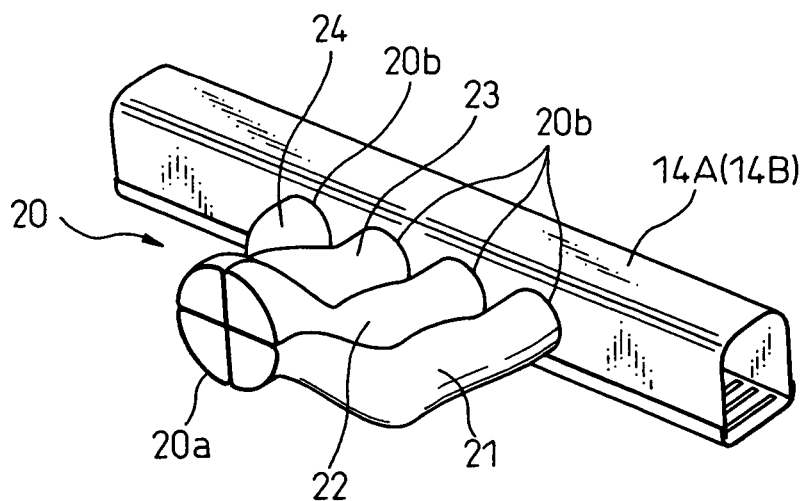
FIG. 4 is a perspective view of an entrance/exit piping structure according to a second embodiment of the present invention.

FIG. 4 illustrates an entrance/exit piping structure 20 according to a second embodiment. While the entrance/exit piping structure 20 is coupled to the longitudinal end surface (the upper end surface) of the header tank 14A, 14B in the above-mentioned first embodiment, according to the second embodiment, the entrance/exit piping structure 20 is coupled to a lateral surface of the header tank 14A, 14B parallel to the longitudinal direction thereof. In this case, a plurality of pipes 21 to 24 (four in FIG. 4) are bundled so that an end portion 20a thereof to be coupled to the supercharger or the engine body becomes a one-piece body having a contour of a circular cross-section without any gaps. Contrarily, the pipe end portion 20b of the entrance/exit piping structure 20 to be connected to the header tank 14A, 14B is coupled to a longitudinal lateral surface of the header tank 14A, 14B so that the plurality of pipes 21 to 24 are arranged adjacent to each other in the longitudinal direction of the header tank.

Figure 5A:
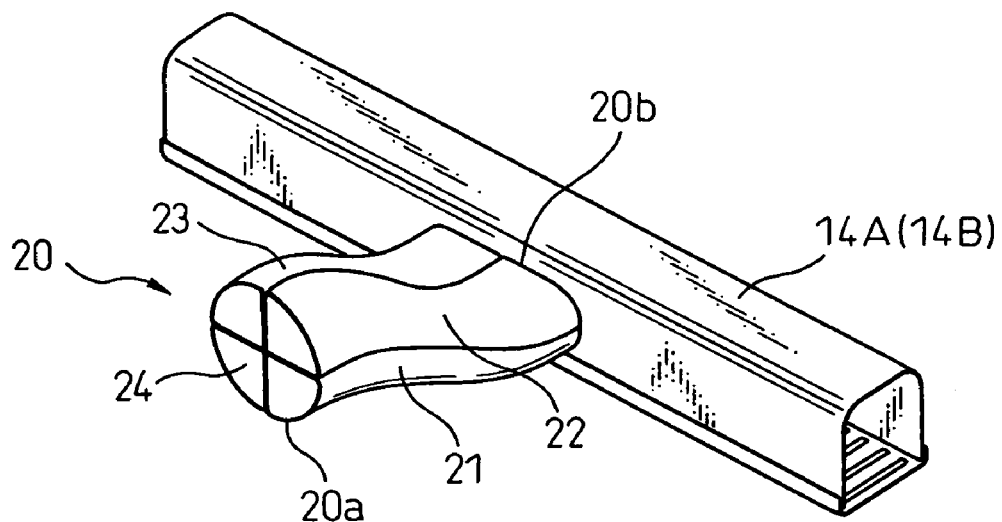
FIG. 5A is a perspective view of an entrance/exit piping structure according to a third embodiment of the present invention.
Figure 5B:
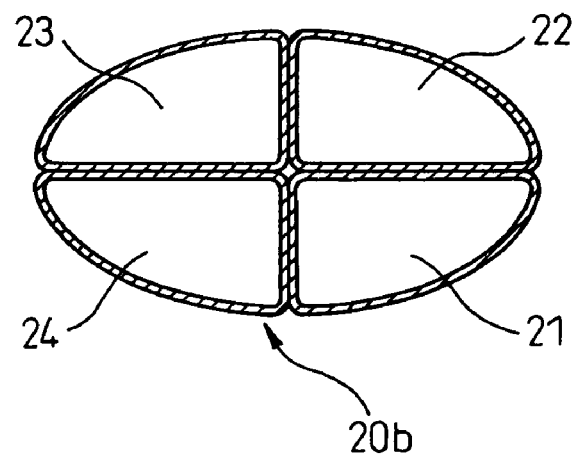
FIG. 5B is a cross-section of an end portion of a pipe in this piping structure.

FIG. 5A illustrates an entrance/exit piping structure 20 of a third embodiment. In the third embodiment, the pipe end portion 20a of the entrance/exit piping structure 20 to be coupled to the pipe of the supercharger or the engine body consists of a plurality of pipes 21 to 24 (four in FIGS. 5A and 5B) bundled together without any gaps to have a circular contour as shown in FIG. 5A in the same manner as in the first and second embodiments. On the other hand, the contour of the pipe end portion 20b in the entrance/exit piping structure 20 to be coupled to the header tank 14A, 14B is flattened from a circular cross-section of the pipe end portion 20a formed by bundling four pipes 21 to 24 to an oval cross-section as a whole as shown in FIG. 5B, as it is easily coupled to a longitudinal lateral surface of the header tank 14A, 14B.

Figure 6:
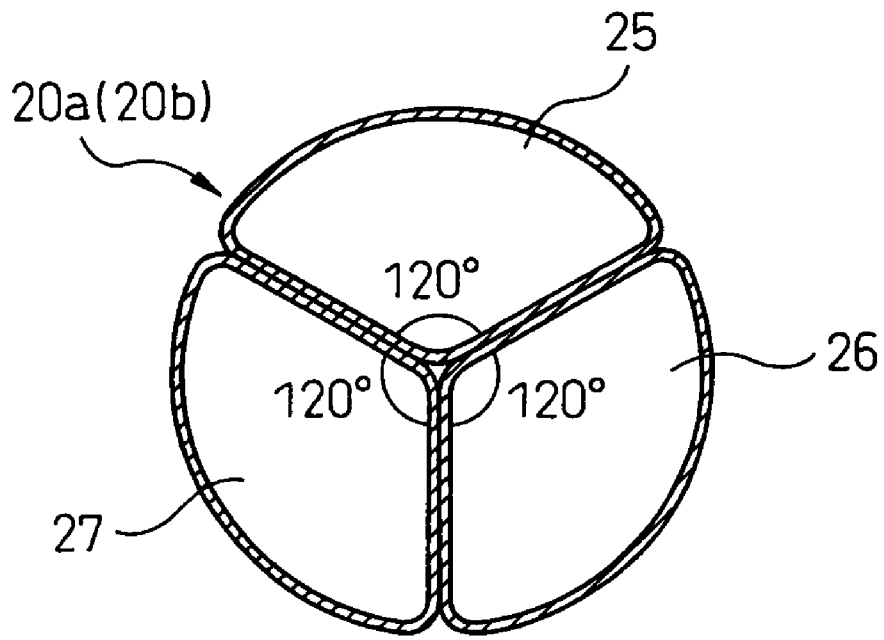
FIG. 6 is cross-sections of a pipe end portion and a middle portion in an entrance/exit piping structure according to a fourth embodiment of the present invention.
Figure 6:
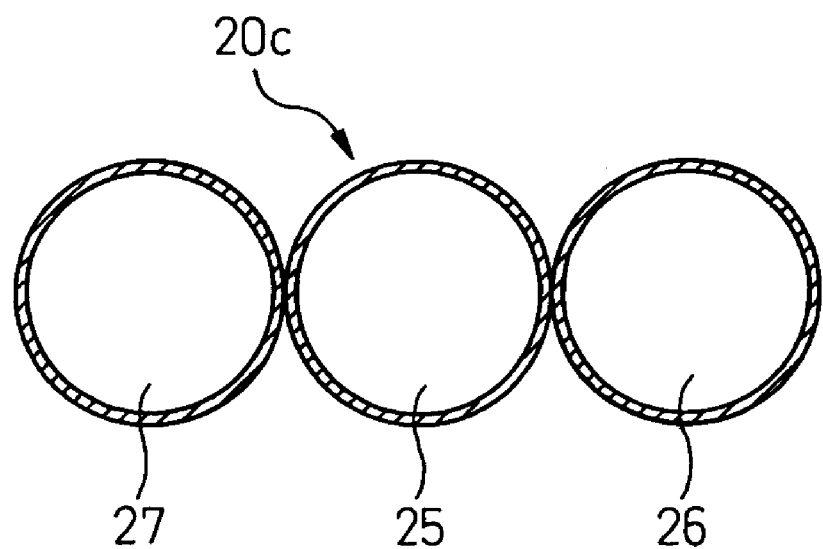

FIG. 6 illustrates cross-sections of the pipe end portion and the middle portion of an entrance/exit piping structure 20 according to a fourth embodiment. In this embodiment, the entrance/exit piping structure 20 is constituted by three pipes 25, 26 and 27. A contour of a cross-section of each the pipe end portions 20a, 20b is a circle formed by combining three sectors, each having an angle of 120°. Of course, in the middle portion 20c, the respective pipes 25 to 27 are laterally arranged adjacent to each other and bent at approximately 90°.

Figure 7C:
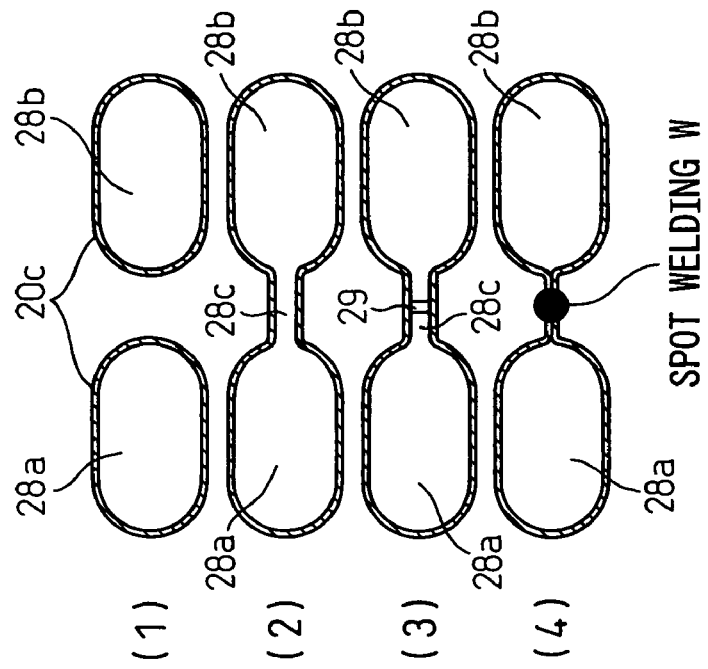
FIG. 7C shows cross-sections showing various kinds (1) to (4) of a middle portion thereof.
Figure 7B:
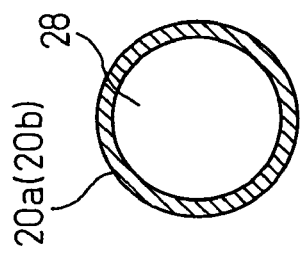
FIG. 7B is a cross-section of both pipe end portions in an entrance/exit piping structure according to a sixth embodiment of the present invention.
Figure 7A:
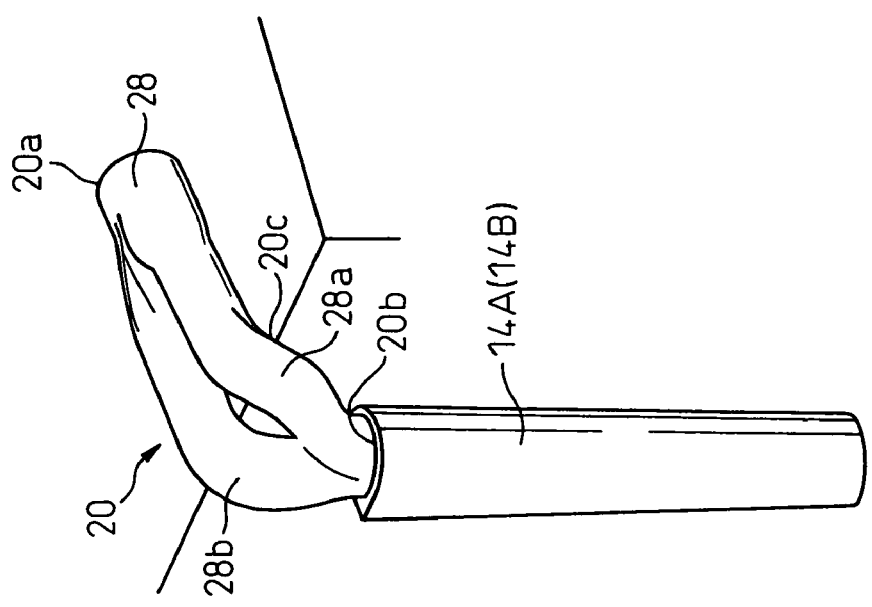
FIG. 7A is a perspective view of a pipe end portion in an entrance/exit piping structure according to a fifth embodiment of the present invention.

FIGS. 7A to 7C illustrate a perspective view of an entrance/exit piping structure of a fifth embodiment, and cross-sectional views of an pipe end portion and a middle portion thereof. While, the entrance/exit piping structure 20 of the above-mentioned embodiments is formed by bundling a plurality of pipes together, according to the fifth embodiment, the entrance/exit piping structure 20 is formed as shown in FIG. 7A, so that the pipe end portion 20a to be coupled to the pipe of the supercharger or the engine and that 20b to be coupled to the engine header 14A, 14B are formed of a single flow path 28, and the middle portion 20c of the entrance/exit piping structure 20 is bifurcated into two flow paths 28a, 28b having a flat cross-sectional shape. In this regard, the middle portion 20c is bent at a suitable angle.

FIG. 7C illustrates various cross-sections of the middle portion 20c of the entrance/exit piping structure 20. Item (1) of FIG. 7C illustrates a structure wherein the bifurcated flat flow paths 28a and 28b are completely separated from each other. Item (2) illustrates the middle portion 20 of an incompletely separated structure wherein a narrow flat path 28c connects the bifurcated flow paths 28a and 28b to each other. In this case, the flat flow path 28c is capable of minimizing the deformation of the bifurcated flow paths 28a, 28b. Item (3) illustrates the middle portion 20c of an incompletely separated structure wherein a narrow flat path 28c connecting the bifurcated flow paths 28a and 28b to each other has a pillar 29. By providing the pillar 29, it is possible to increase the strength of the bifurcated flat flow paths 28a, 28b as well as restrict the deformation of the flow paths 28a, 28b. Item (4) illustrates the middle portion 20c of an incompletely separated structure wherein the flat flow path 28c connecting the bifurcated flow paths 28a, 28b to each other is made as narrow as possible (so that upper and lower inner walls of the flat flow path 28c are brought into contact with each other) and closed by a spot welding or others. In this case, a deformation-minimizing effect is obtainable which is approximately equal to the entrance/exit piping structure of the completely separated structure, while the processability is more improved than in the entrance/exit piping structure of the completely separated structure.

As described hereinabove, according to the present invention, the entrance/exit piping structure 20 can be constituted by any number of pipes. The number of pipes is suitably selected in view of a gap in the engine room above the radiator in which the entrance/exit piping structure is disposed.

Material for forming the entrance/exit piping structure 20 may be stainless steel, iron, aluminum (including an aluminum alloy), copper or others. The pipe end portions 20a, 20b are preferably connected by welding, brazing or others.

According to the inventive entrance/exit piping structure of the intercooler, it is possible to easily avoid the interference with the radiator or others, and to easily form a flat middle portion. Also, as the flat shape is formed by a plurality of pipes, it is possible to reduce the pressure receiving area without decreasing the cross-sectional area of the flow path and to minimize the deformation of the pipes.

While the invention has been described by reference to specific embodiments chosen for purposes of illustration, it should be apparent that numerous modifications could be made thereto, by those skilled in the art, without departing from the basic concept and scope of the invention.

What is claimed is:

1. An entrance/exit piping structure supplying pressurized air from a supercharger to an intercooler; the pressurized air being cooled in the intercooler to increase its density and being fed to an engine body, wherein the entrance/exit piping structure is formed of a plurality of pipes;

one pipe end portion adapted to be coupled to a supercharger-side or an engine body-side has the plurality of pipes combined to have a contour approximately the same as a contour of each of the plurality of pipes, and a generally middle portion of the entrance/exit piping structure is bent;

the other pipe end portion adapted to be coupled to a header tank of the intercooler has a contour approximately the same as a contour of a coupling portion of the header tank;

in part of the entrance/exit piping structure, the plurality of pipes forming the entrance/exit piping structure are arranged adjacent to each other to satisfy the requirements of space and strength;

the entrance/exit piping structure includes an entrance pipe and an exit pipe;

a cross-sectional shape of the generally middle portion of each of the plurality of pipes is circular; and the plurality of pipes are laterally arranged immediately adjacent each other in the generally middle portion of the entrance/exit piping structure.

2. The entrance/exit piping structure as defined by claim 1, wherein the entrance/exit piping structure has approximately the same cross-sectional area in all cross-sections thereof.

3. The entrance/exit piping structure as defined by claim 1, wherein a cross-sectional shape of a pipe end portion of each of the plurality of pipes is generally a sector.

4. The entrance/exit piping structure as defined by claim 1, wherein the entrance/exit piping structure is bent at an angle of approximately 90°.

5. The entrance/exit piping structure as defined by claim 1, wherein the other pipe end portion has the plurality of pipes combined to form a circular contour.

6. An entrance/exit piping structure comprising:

a plurality of pipes having a first end, a second end and a middle portion disposed between said first end and said second end; wherein the middle portion of each of the plurality of pipes has a generally circular contour;

the plurality of pipes at the first end are combined to form a single generally circular contour;

the plurality of pipes at the second end are combined to form a single generally circular contour; and the middle portion of each of the plurality of pipes is bent.

7. The entrance/exit piping structure as defined by claim 6, wherein the middle section of each of the plurality of pipes is immediately adjacent the middle section of an adjacent pipe.

8. The entrance/exit piping structure as defined by claim 6, wherein a cross-sectional area of each of the plurality of pipes is generally constant along a total length of the pipe.

9. The entrance/exit piping structure as defined by claim 6, wherein a cross-sectional shape of each of the plurality of pipes at the first end is generally a sector of a circle.

10. The entrance/exit piping structure as defined by claim 6, wherein each of the plurality of pipes is bent at an angle of approximately 90°.

* * * * *